United States Patent [19]

Tee, Jr.

[11] Patent Number: 5,416,536
[45] Date of Patent: May 16, 1995

[54] EYEGLASS LENS PIECE WITH REAR VIEW REFLECTIVE SURFACES

[75] Inventor: Ronald S. Tee, Jr., Cornelius, Oreg.

[73] Assignee: Waht If Solutions, Inc., Hillsboro, Oreg.

[21] Appl. No.: 938,547

[22] Filed: Aug. 28, 1992

Related U.S. Application Data

[63] Continuation-in-part of Ser. No. 788,763, Nov. 7, 1991, abandoned.

[51] Int. Cl.6 ............................................. G02C 7/14
[52] U.S. Cl. ...................................... 351/50; 351/44; 351/155
[58] Field of Search .................... 351/44, 47, 50, 158, 351/155; 2/10, 13, 15, 410, 424, 425

[56] References Cited

U.S. PATENT DOCUMENTS

| | | | |
|---|---|---|---|
| 3,423,150 | 1/1969 | Freed | 351/50 |
| 4,603,944 | 8/1986 | Greenlaw et al. | 350/252 |
| 4,653,123 | 3/1987 | Broersma | 2/425 |
| 4,766,609 | 8/1988 | Lane | 2/424 |
| 4,867,550 | 9/1989 | Jannard | 351/44 |
| 4,919,529 | 4/1990 | Hyun | 351/50 |
| 4,991,952 | 2/1991 | Grau | 351/120 |
| 5,005,964 | 4/1991 | Berke et al. | 351/50 |

FOREIGN PATENT DOCUMENTS 3823366A 1/1990 Germany ............................. 351/50

OTHER PUBLICATIONS

Publication: Bicycling Title: Funglasses Date: Apr. 1991, pp.: 146–152.

Publication: Women's Sports & Fitness, Title: Sports Specs, Date: Jul./Aug. 1991, pp.: 41–43.

Primary Examiner—William L. Sikes
Assistant Examiner—Hung Xuan Dang
Attorney, Agent, or Firm—Mark D. Olson

[57] ABSTRACT

An aerodynamic eyeglass lens piece which integrally combines a central inboard transparent section with laterally outboard mirror sections, thus enabling a forward facing user to see objects in front as well as behind. The lens piece sections form one agonic lens piece comprising: a light transmissive transparent section and fully reflective mirror sections. The mirror sections have an anatomical shape permitting unhindered over the shoulder viewing for bicycle riding. Several enhancements allow the lens piece to be interchangeable with tinted or clear alternatives. In the preferred eyeglass embodiment of the invention, the lens piece is selectively adjustable to a variety of operative positions. These enhancements serve to provide added versatility, fine tuning and custom fitting for the user. An alternate embodiment fits the lens piece to the existing sport helmet of the user. This helmet eyeshield embodiment functions in substantially the same way as the eyeglass embodiment with the added advantage of the user being able to use prescription glasses with the eyeshield. By virtue of the rearward viewing made possible by either lens piece embodiment, the user can achieve a panoramic view. This permits good spatial orientation thus improving safety for bicyclists and other sport participants in a way that is technically satisfying yet aesthetically pleasing.

20 Claims, 4 Drawing Sheets

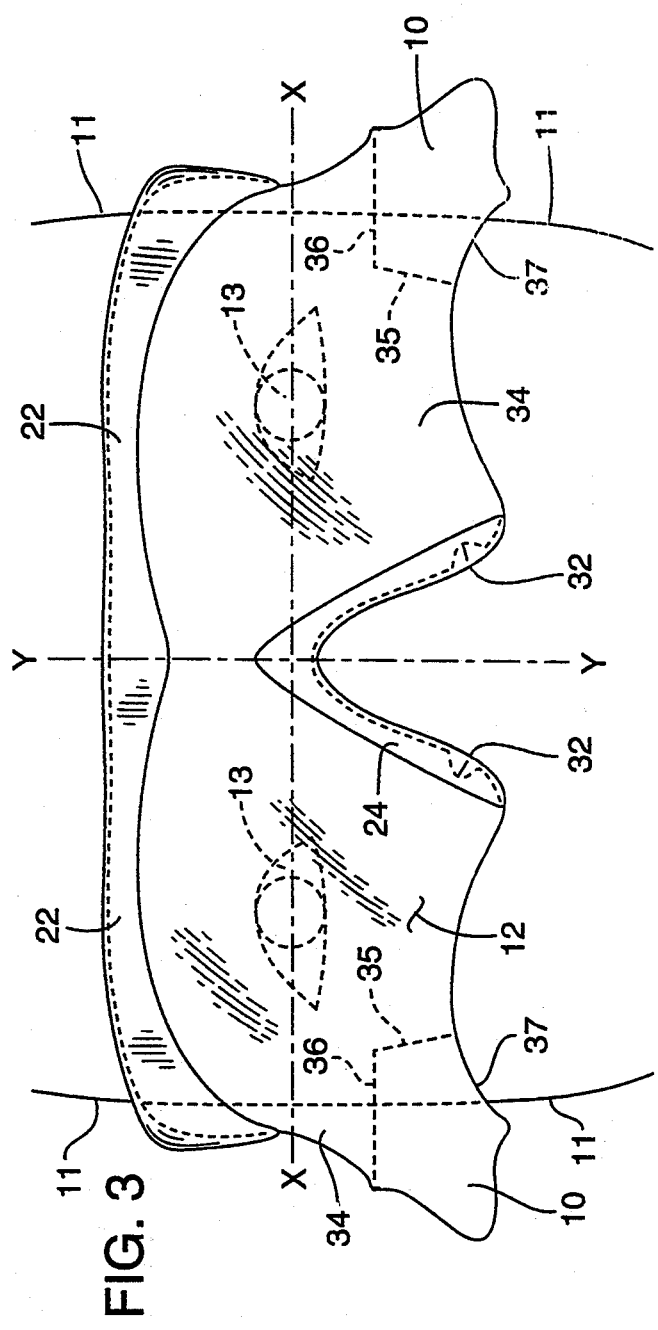
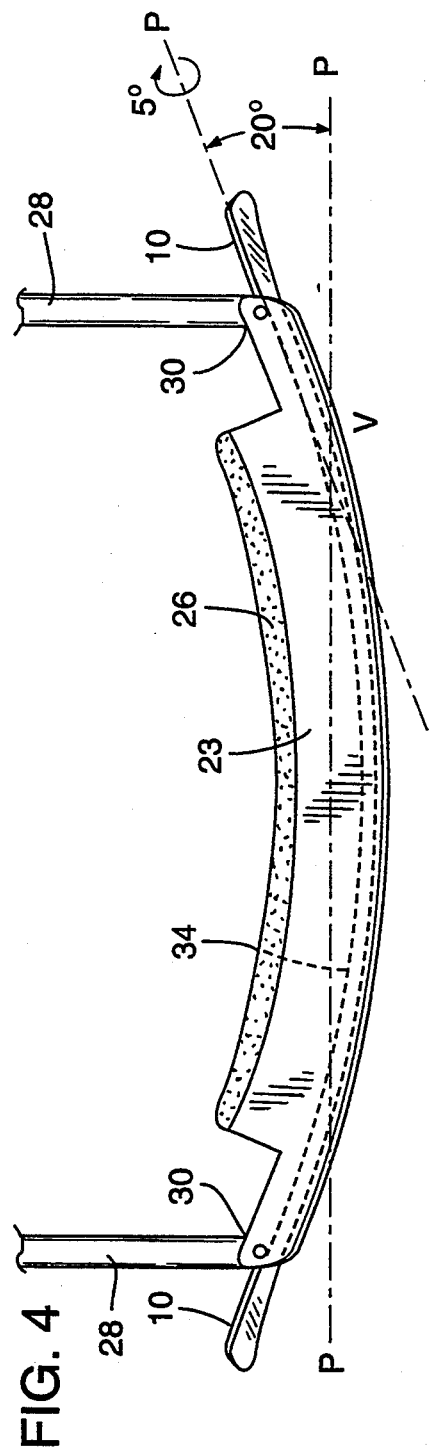
FIG. 3
FIG. 4

FIG. 9
FIG. 10
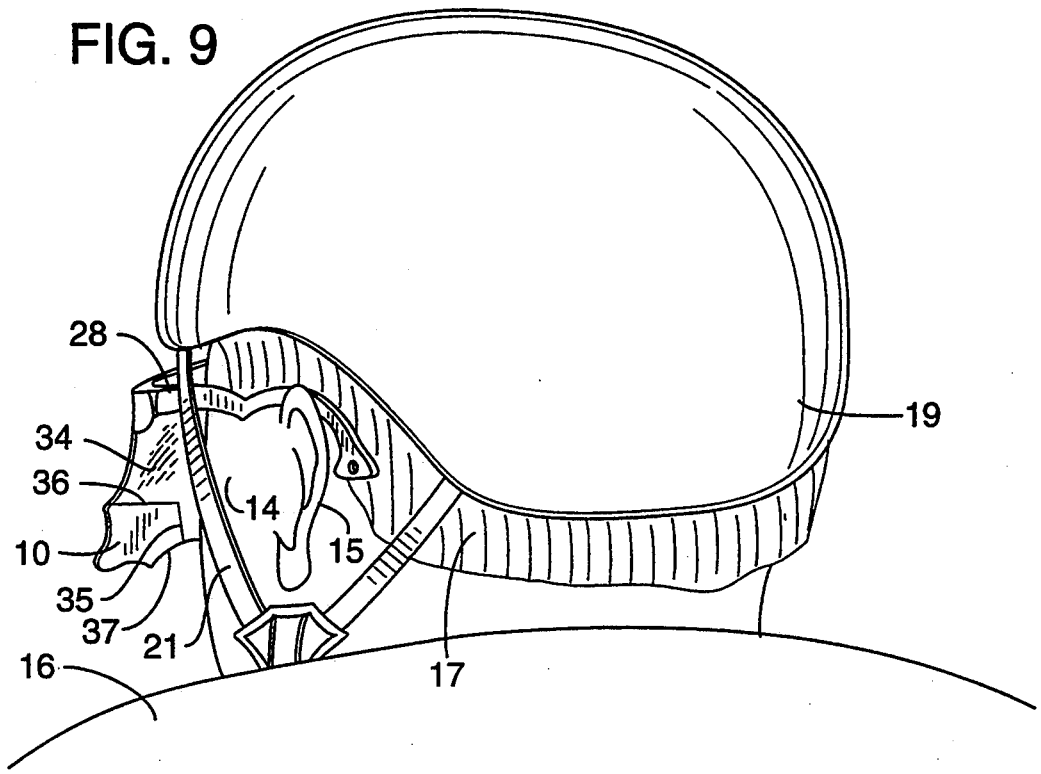
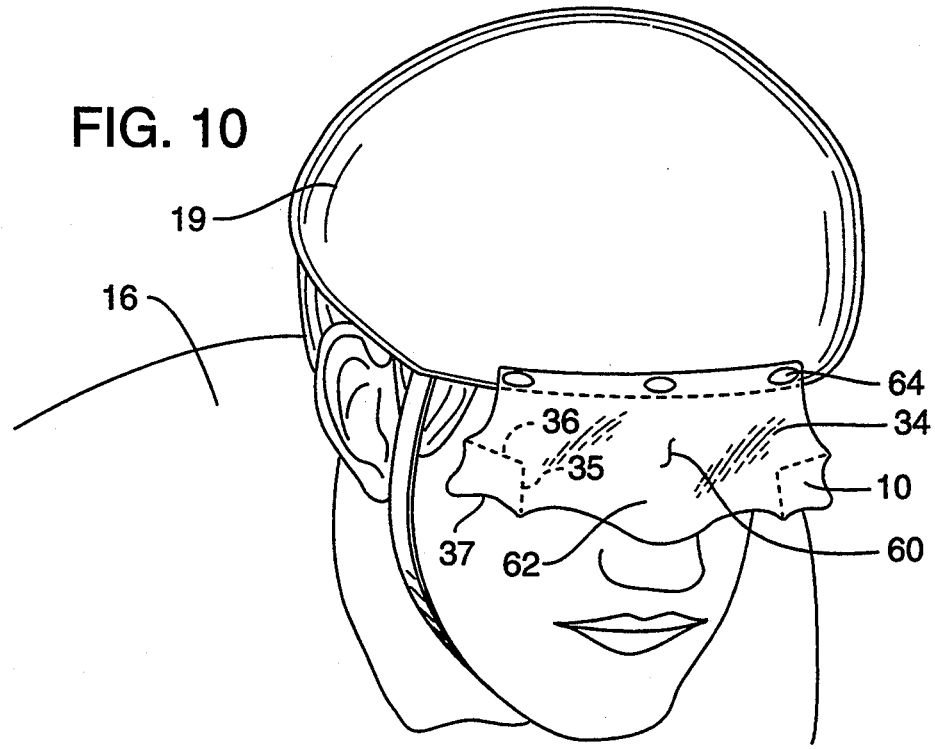

EYEGLASS LENS PIECE WITH REAR VIEW REFLECTIVE SURFACES

This application is a continuation-in-part of my application Ser. No. 07/788,763, filed Nov. 7th, 1991, abandoned.

FIELD OF THE INVENTION

The invention is directed to an eyeglass and more particularly a lens piece, integral parts of which are rear view reflective surfaces, permitting forward vision and also the viewing of objects behind a forward facing user.

BACKGROUND OF THE INVENTION

Germane to bicycling and many other sports is the problem of 'seeing behind'. A long standing need, recognized especially in bicycle riding, is for the rider to see traffic approaching from the rear without having to bodily swivel around to do so. Looking back in this manner can be very dangerous as it frequently causes the rider to swerve or wander into the path of an approaching vehicle. The reason for this is excessive head movement and the simple fact that the rider naturally tends to steer and lean in the direction he is looking. Therefore, to maintain good balance while 'seeing behind' it is necessary for the rider to keep his head steady. Similarly, this same phenomenon is observable, only to a lesser degree, while driving a motor vehicle. The need for 'seeing behind' is underscored even more emphatically by the continued absence of uniform laws. Typically there is no minimum safe distance stipulated for a motor vehicle when passing a bicycle in traffic. The bicycle rider cannot totally rely on audible clues to traffic coming from behind. He must at times change lanes and make turns, and such maneuvers require good spatial orientation and reliable information. Wrong assumptions or uncertainty regarding traffic conditions can and all too frequently do have dire consequences.

Heretofore, individuals have attempted to solve the bicyclist's problem of 'seeing behind' by developing mirror devices for rear viewing, none of which are widely accepted. These fall broadly into several types: handlebar mounted mirrors, helmet mounted mirrors and eyeglass mounted mirrors. Handlebar mounted mirrors receive a great deal of road shock directly through the front fork and bicycle frame. Therefore, they are very prone to vibration which can result in blurred vision and frequent readjustments. The helmet mounted type has likewise met with minimal acceptance due to a lack of aesthetics, poor aerodynamics and a perceived safety hazard which could result from a head first crash while having an object protruding forward in front of the rider's face. Eyeglass mounted mirrors have many of the same drawbacks including poor aerodynamics and the sacrificing of some forward visibility. The nuisance of having a permanent fixture suspended in front of the user's face requires an unwelcome accommodation generally rejected by most riders. It is readily apparent the above prior art solutions, of which U.S. Pat. No. 4,603,944, issued Aug. 5, 1986 to Greenlaw et. al. is exemplary, have failed to fully satisfy the need for 'seeing behind'.

Despite the explosion in bicycling popularity, the market place has demonstrated incredible inertia and resistance to the above solutions. It is estimated they have cumulatively achieved a market penetration of only 25%. There is still further evidence of this reluctance to adopt the existing solutions offered. The users of the above products tend to be demographically skewed towards the more safety conscious, older bicyclists. The net result is approximately 3 of 4 bicyclists have so far spurned the available solutions. This group of generally younger and more aggressive riders has chosen to do without any type of rear viewing device at all. As for 'seeing behind', they continue to bodily swivel around consequently incurring the increased safety risks involved with this practice. Clearly, the extant problem of 'seeing behind', at least in the sport of bicycling today, has not to any great measure been alleviated by the solutions offered by the prior art.

This massive resistance to the prior art is largely attributable to the fact that the sport of bicycling has become extremely high tech and image conscious. In order for a product to meet with success here it must possess a combination of the following three qualities: (1) good aerodynamic and/or anatomical characteristics, (2) satisfying technical function and (3) an aesthetically pleasing style. In most cases these qualities are of equal relative importance. Thus, the lack of products for rear viewing evidencing even two of these qualities has left a sizable void in the market place. It is to this void that the present invention is directed.

By virtue of my invention, the state of the art will be advanced such that bicyclists not currently employing any rear viewing devices will be included into the ranks of those who do. A significant positive impact on the safety record of bicycles in traffic will be achieved, and the general public, be they bicyclists or other road users, will be the ultimate beneficiaries.

DESCRIPTION OF RELATED ART

There are other prior art examples for rear viewing; however, these are heretofore unknown in the sport of bicycling. They address the problem of 'seeing behind' by incorporating mirrors or reflective elements into a pair of eyeglasses. Examples of these are U.S. Pat. Nos. 3,423,150, issued Aug. 23, 1965 to Freed; 5,005,964, issued Apr. 9, 1991 to Berke, et. al. and 4,919,529, issued Apr. 24, 1990 to Hyun. Although eyeglasses in great variety are utilized by bicyclists everywhere, and in many other sports as well, the prior art cited above are not now utilized nor have they been in common usage in the past. Nonetheless, these prior art examples are related and referenced here in order to provide comprehensive background information so that the present invention can be completely understood and appreciated in its proper context.

As stated above, the bicycling sport has become extremely image conscious. Products combining good aerodynamic form with technically satisfying function and an acceptable style are highly sought after. It is precisely in this area of combining these three desirable qualities of form, function and style that the prior art examples are deficient. Generally they were not intended as sport glasses to begin with. Hence, they are unsuited as such and, therefore, not found in the marketplace. It is the specific goal of the present invention to overcome these deficiencies.

As a final consideration it should be noted that in bicycling the preferred riding position is the dropped position. This position requires the rider's trunk to be greatly inclined over the handlebars. While his trunk approaches the horizontal he must at the same time hold his head up for visibility. In this otherwise unusual, albeit aerodynamic, position rearward vision can be hindered by the riders own cheeks and shoulders. None of the prior art representations address themselves to this point which is specific to bicycling in particular as well as to many other sports requiring a crouched forward position. Furthermore, from the rider's perspective in the dropped position, the prior art examples have no purpose specific angularity. Hence, they do not target the appropriate field of view to encompass traffic approaching from behind. Therefore, to obtain the desired view it is necessary to aim the mirror sections by significant head movement on the part of the rider.

The Freed U.S. Pat. No. 3,423,150 shows a pair of glasses with sliding and rotatable mirror elements. While its function is similar to the eyeglass mounted mirror type discussed above, it suffers from the same lack of the necessary qualities of aerodynamic form and stylish appearance. In the preferred embodiment, the rear viewing elements are movable and are viewed through each respective primary lens. This is not the case in the present invention.

The Berke et. al. U.S. Pat. No. 5,005,964 likewise shows a pair of glasses with forward extending and rotatable mirror elements. With similar utility to the above reference, it too suffers from the same aspects. This example employs movable, pivoting rear vision elements which would have a tendency to fold back out of adjustment with the force of the wind created in the slip stream of a bicycle at high speed. Blurred vision would also be a factor due to the thin wire supports allowing the mirrors to be whipped about by the wind and road vibration. Furthermore, peripheral vision may be interfered with due to parts of the eyeglass frame obstructing the rear vision elements. In this example as well, the rear vision elements are movable and are viewed through the primary lens. This differs from the present invention which employs no such movable rear vision elements as is done here.

The Hyun U.S. Pat. No. 4,919,529 shows a pair of glasses without movable mirror elements but with two forward protruding walls intended to obstruct vision of one eye while simultaneously permitting vision of the opposite eye. The present invention has no such walls as they are unnecessary and even dysfunctional here.

In the Hyun patent the mirror portions are integral to the lens; however, they are so large that a great deal of peripheral vision is lost. These mirror portions excessively detract from lateral visual acuity by obstructing forward vision along the entire lateral margins of each lens.

In contrast to Hyun, the position, shape and angle of the mirror sections of my invention are specifically designed for sports, in particular bicycling. My mirror sections are much smaller, covering only a portion of the lateral outboard margins, and preferably positioned only in the lower, outboard extremities of the lens piece. The transparent section extends laterally all the way to both edges of the lens piece, affording a full range of unobstructed peripheral vision to the sides. Furthermore, unlike Hyun's, the mirror sections of the present invention are anatomically shaped to conform to the hunched shoulders of a bicyclist riding in the dropped position. The reflected images do not include the rider's shoulders, the sides of his cheeks, ears, hair or the straps of his helmet. Finally, another significant difference from Hyun is the fact that the mirror sections of my invention are precisely angled and canted downward and away from the plane of the rest of the lens piece. This serves to reflect only the targeted area behind the wearer, namely (in the case of the bicyclist) the traffic approaching from behind. This allows the wearer's head movement to be kept to a minimum. This is not the case in Hyun where the transparent and mirror sections are in the same plane and have a parallel orientation to each other. Thus, the desired view must be searched out by movement of the user's head.

In summary, the Hyun reflected image is not purpose specific as it is in the present invention. Hence, given an identical position and vantage point, the reflected image of the Hyun glasses compared with that of my invention would not be identical. In effect, for bicyclists the Hyun reflected image would be akin to having a rear view mirror on a car out of adjustment. Since Hyun's sunglasses are not adjustable they are rendered useless for the purposes of bicycling as well as many other sporting activities.

A final reference of note is U.S. Pat. No. 4,867,550 issued Sept. 19, 1989 to Jannard. Here a toroidal lens is taught. This differs from the present invention as it is devoid of any means for rear viewing. In addition, the lens piece of the present invention is generally spheroidal in form rather than toroidal as in Jannard. Furthermore, the Jannard lens could not be adapted with reflective surfaces as the resultant mirror sections would have the wrong angle and be much too close to the wearer's face to be of any use.

Whatever the precise merits, features and advantages of the rear viewing prior art references cited above, they are unsuitable for sporting activities. They are neither aerodynamic nor anatomical and require considerable accommodation and head movement on the part of the user. The prior art references are not convenient, functional or user-friendly for athletic pursuits. They generally have many moving and/or forward protruding parts, restrict peripheral vision and may result in blurred vision. Lastly, they do not possess an aesthetically pleasing style, nor do they achieve or fulfill the purposes and utility made possible by the present invention.

OBJECTS OF THE INVENTION

The primary need of increased safety of the user is paramount. With this in mind, it is clear that good spatial orientation is necessary which in turn can only be attained via a panoramic view of the surroundings. Accordingly, the principal objects and advantages of my invention are:

(a) to provide an eyeglass lens piece which increases user safety by enabling good spatial orientation through undistorted, vibration free rear vision.

(b) to provide an eyeglass lens piece which employs a minimum elements and no moving or forward protruding parts.

(c) to provide an eyeglass lens piece which is as user-friendly as possible by placing minimal accommodation and head movement requirements on the user.

(d) to provide an eyeglass lens piece which is virtually as convenient to use as conventional glasses.

(e) to provide an eyeglass lens piece whose characteristics exhibit superior aerodynamic performance.

(f) to provide an eyeglass lens piece whose function is both technically and anatomically satisfying by enabling a wide field of view with clear, unhindered and targeted rear vision.

(g) to provide an eyeglass lens piece which minimizes the loss of lateral visual acuity and maximizes peripheral vision.

(h) to provide an eyeglass lens piece which may be used as weather protective as well as sunglasses and be suitable for sporting activities.

(i) to provide an eyeglass lens piece which is selectively adjustable for fit and lens piece angle.

(j) to provide an eyeglass lens piece which can be attached to a pre-existing sports helmet of the user.

(k) to provide an eyeglass lens piece which can be used with a pair of prescription eyeglasses without any need to modify or alter the glasses.

Furthermore, the underlying object of my invention is to achieve a lens piece construction developed specifically to combine the above cited objects while at the same time maintaining an aesthetically pleasing style commensurate with a high tech image.

SUMMARY OF THE INVENTION

The present invention relates to a unitary eyeglass lens piece, integral portions of which enable forward vision and also the viewing of objects behind a forward facing user. The lens piece configuration is a continuously uniform, agonic unit with a transparent section and preferably two mirror sections. The salient feature of the lens piece are the integral mirror sections which are purposefully positioned, shaped and angled for satisfying function in certain sports, especially bicycling. The smoothly curved transparent section is integrated with the angled back mirror sections forming a unitary lens piece having streamlined aspects demonstrating good aerodynamic characteristics.

In the preferred embodiment, the lens piece is incorporated in an eyeglass assembly. The eyeglass assembly is comprised principally of four elements: the unitary lens piece, a frame, a nose piece and two ear pieces. The first element: the lens piece comprises a central inboard transparent section and two laterally outboard mirror sections. The second element: the frame comprises a close fitting groove along its lens piece receiving section and a wide curved bridge in the brow section accommodating an integral brow pad. The third element: the nose piece comprises a close fitting groove to accommodate the lens piece and soft nose pads commonly used in eyeglass construction. The forth element: the ear pieces comprise two conventional hinges with screws for pivotally attaching them to the frame.

The lens piece comprises the transparent section formed by a spheroidal segment and its associate mirror sections which are uniquely shaped to conform to the anatomy of a bicyclist in the dropped position. The transparent section is for forward viewing and the mirror sections are for rearward viewing. To obtain a forward view, the wearer will look through the transparent section. To obtain a rearward view and see behind the wearer will direct his eyesight to and momentarily focus on one or the other of the mirror sections. The transparent section has a convex front face and a substantially parallel concave rear face and has a smooth spheroidal form which tangentially relates the transparent section to the mirror sections. The mirror sections are slightly swept backward. These lens piece sections taken collectively form one agonic integral lens unit. This clean profile reduces frontal area and wind resistance by effectively eliminating flat or angled wind catching surfaces thus ensuring superior aerodynamic performance.

In order for a bicyclist to achieve maximum aerodynamic advantage, an extreme crouched position over the handlebars is desirable. This position places the rider's head in line with his shoulders and trunk on a plane approaching the horizontal. The reflected field of view in the mirror sections must not be hindered by the side of the rider's cheek or the top of his shoulders thus interfering with his rear vision. In the present invention the portions of the lens piece comprising the mirror sections are purposefully shaped such that they conform to the anatomy of the rider. The mirror sections are anatomically shaped such that their underside is curved to conform to the slope of a bicycle rider's shoulders and the inboard edge is slanted to conform to the rider's face and head. Hence, the cheeks, hair, ears and helmet straps are not seen but rather just missed in the reflected image of each mirror section. Moreover, each mirror section is positioned to the lower, outside distal, extremity of the lens piece and angled precisely to reflect rearward approaching traffic from the vantage point of a bicyclist. The targeted images fall along a line of sight substantially parallel to the side of the wearer's head. Additionally, head movement requirements are reduced to a minimum. The vantage point from the seat of a conventional bicycle is somewhat elevated above the road, with the body bent forward at the waist and the head held up for visibility. Thus, the mirror sections adopt a unique shape and small size such that the desired over the shoulder vision is maintained while minimizing interference from the rider's own body. Peripheral interference is further diminished by eliminating the frame sections bordering the sides and bottom portions of the lens piece perimeter.

By application of reflective coatings only to the lateral extremities of the lens piece, two small integral mirror sections are effectually produced. Peripheral vision is preserved by only coating that portion of the lens piece needed to effect the unique anatomically shaped mirror sections. The resultant mirror sections thus produced do not encompass the entire lateral margins as in the Hyun patent. In the present invention the transparent section extends all the way to both edges of the lens piece, whereby peripheral vision to the sides is maximized. This allows the user to still view over the top of as well as around the mirror sections, thereby maintaining lateral visual acuity through a full range of peripheral vision to the sides. This bifocal effect is not present in the prior art examples. Either full frames with large marginal opaque mirror sections are used as in the Hyun patent or a full frame with movable rear vision elements are used as in Freed and Berke et. al. patents.

The brow section at the top of the frame forms a broad curved bridge which incorporates a thick brow pad to give adequate focal length between the user's eyes and the corresponding mirror sections. This predetermined focal distance serves to reduce strain and to ensure ease of focus. As in an automobile, the length of time needed for rear viewing is but a few seconds. The frame, nose piece and ear pieces together cooperate to support and position the lens piece on the wearer.

Interchangeable lens pieces may be employed for varying light conditions. For bright sunshine a lens piece having a tinted transparent section is used. For overcast days or night riding a lens piece having an amber or clear transparent section would be substituted. Through several different embodiments of the nose and ear pieces, fine tuning for fit and lens piece adjustment can be accomplished to suit the personal needs of the individual user. These enhancements serve to further add versatility to the invention but are non-essential to its operation. Since the lens piece is closely fitted within the lens piece receiving sections of the frame, exchanging lens pieces is easily accomplished. The lens piece can be removed from its frame by firmly grasping the lens piece in one hand and applying moderate pressure to leverage off the frame held in the other hand. The reverse procedure is used to position the replacement lens piece. Likewise, the nose piece can be slightly compressed between thumb and forefinger to disengage it from the lens piece notches located in the recess. The removed nose piece is repositioned in the replacement lens piece by sliding the nose piece into the recess until the nose piece springs into place, once again engaging and mating with the lens piece notches.

An alternate embodiment of the eyeglass lens piece is the helmet eyeshield adaptation of my invention. Here the substantially same lens piece is mounted to the front of the brow portion of a cyclist's helmet. This is accomplished either via hook and loop (VELCRO type) adhesive fastener, conventional snap type fasteners or a similar attachment means. This attachment means rigidly affixes the eyeshield to the sports helmet of the user. The helmet eyeshield, unlike the eyeglass embodiment, does not employ a nose piece. Hence, it has no recess or notches. Instead, the smoothly curved spheroidal segment forming the central transparent section continues uninterrupted across the nose area. This effectively produces a complete shield covering the nose, eyes and forehead of the wearer. Improved aerodynamic performance once again is realized in this embodiment. The major advantage of this embodiment, however, is that the wearer is afforded the possibility of wearing a pair of prescription eyeglasses underneath the eyeshield. This poses a major advantage for cyclists and other sport participants who wear corrective eyeglasses but do not wear contact lenses. The eyeshield can be either retro-fitted to existing helmet designs or a helmet may be specially constructed to optimally integrate the eyeshield with the helmet. The eyeshield lens piece is replaced by cradling the helmet in the crook of one arm and hand. While thus firmly cushioning the helmet, the eyeshield is unsnapped or unfastened with the other hand. The reverse procedure is used to secure the replacement eyeshield to the helmet.

Both embodiments may be molded as one piece in a single manufacturing step and are devoid of moving or forward protruding parts. In either embodiment the transparent section is positioned such that it extends laterally between, in front of, above, below and a space distance outwardly from the sides of the user's eyes to the approximate sides of the user's head. The mirror sections are tangentially oriented to the curved form of the transparent section and positioned in the near proximity of the user's eyes and at a predetermined focal distance. They cover an area extending laterally from within the side of the user's head to and including an area externally beyond the sides of the user's head. The mirror sections are intentionally kept as small as practical in order to maximize peripheral vision.

The eyeglass and the eyeshield adaptations are both very user-friendly requiring no consumer education. They are convenient and easy to use in that they are similar to a conventional pair of glasses or helmet eyeshield. Only one pair of glasses or helmet eyeshield per bicyclist is needed, not one per bicycle as is the case with handlebar mounted mirrors. At first introduction to the invention, a bicyclist will readily appreciate the novel features as beneficial to the sport. The foregoing and further objects, advantages and features of my invention will be apparent from a consideration of the drawings and the ensuing description of them.

BRIEF DESCRIPTION OF THE DRAWINGS

FIG. 3 is a front view of the eyeglass embodiment shown in FIGS. 1 and 2 which is shown superimposed over the fragmentarily illustrated head of a wearer.

FIG. 4 is a fragmentary plan view of the eyeglass embodiment shown in FIG. 3.

FIG. 9 is a left rear perspective view of a bicyclist utilizing the eyeglass embodiment of the invention.

FIG. 10 is a right front perspective view of a bicyclist utilizing the helmet eyeshield embodiment of the invention.

REFERENCE NUMERALS IN DRAWINGS

Figure 1:
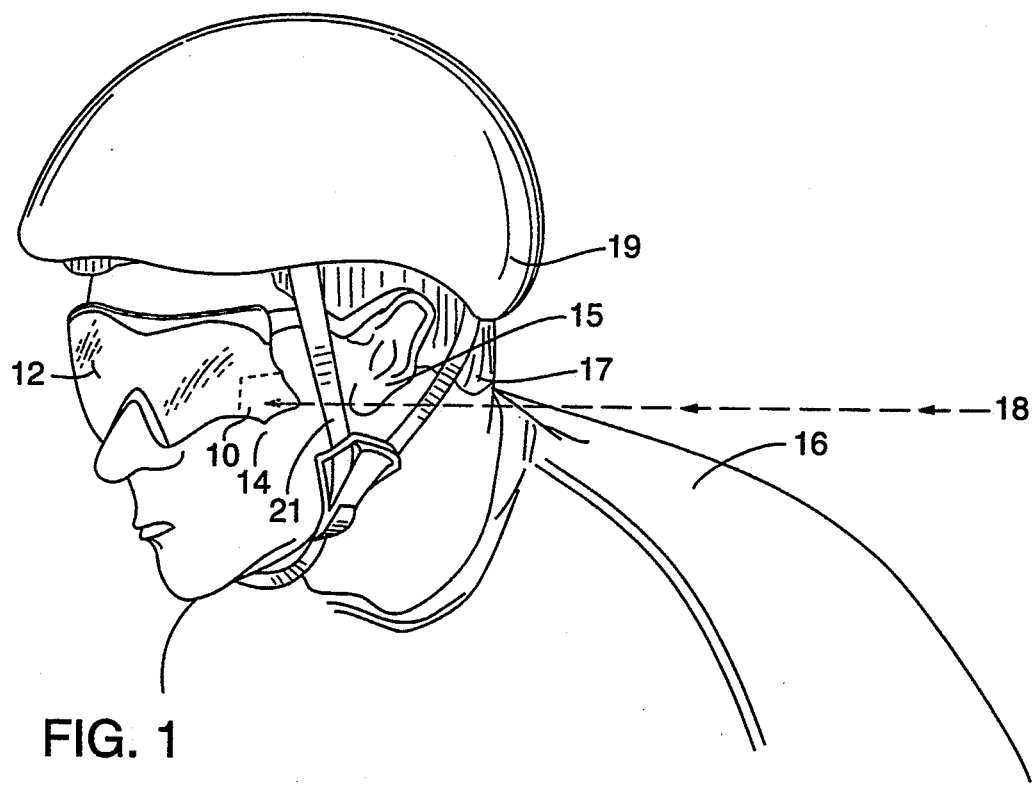
FIG. 1 is a left front perspective fragmentary view of a bicyclist in traffic utilizing eyeglasses embodying the invention.
Figure 2:
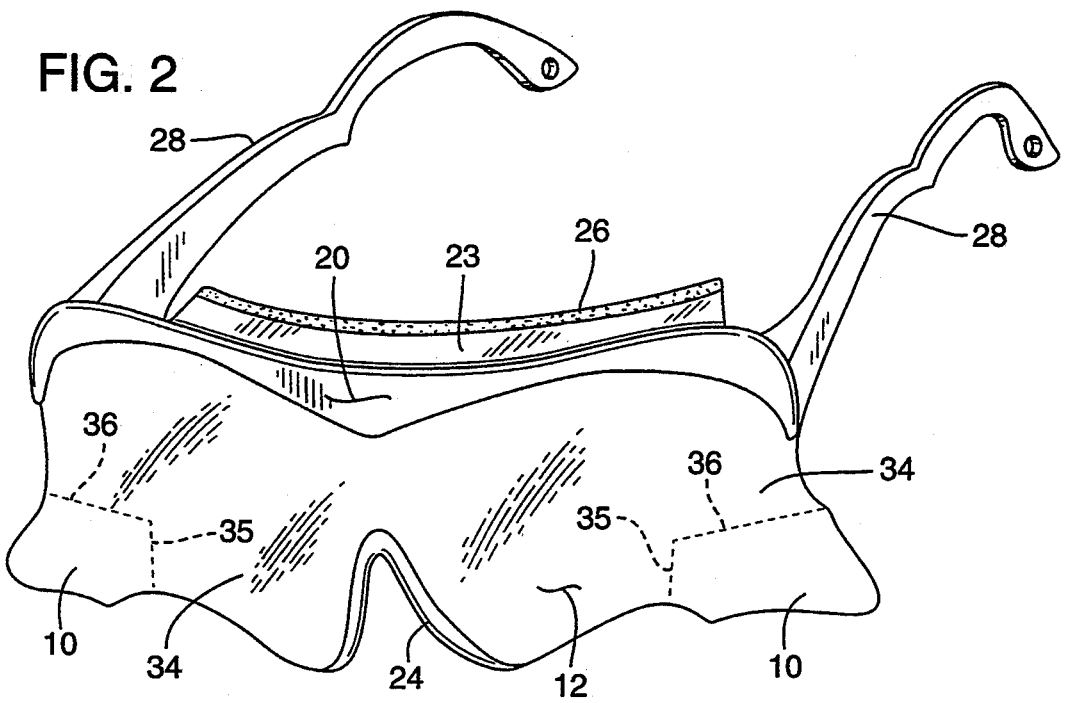
FIG. 2 is a front perspective view of the eyeglass embodiment of FIG. 1 showing the lens piece, its frame, nose and ear pieces.

| REFERENCE NUMERALS IN DRAWINGS | |
|---|---|
| 10 mirror sections | 11 side of user's head |
| 12 eyeglass lens piece | 13 user's eyes |
| 14 rider's cheek | 15 rider's ear |
| 16 rider's shoulder | 17 rider's hair |
| 18 approaching traffic | 19 helmet |
| 20 eyeglass frame | 21 helmet strap |
| 22 lens piece receiving section | 23 brow section of frame |
| 24 nose piece | 26 brow pad |
| 28 ear pieces | 30 hinges for ear pieces (28) |
| 32 notches | 34 transparent section |
| 35 inside separation line | 36 top separation line |
| 37 underside inner edge | 38 nose piece pads |
| 40 mercury (or silver) coating | 42 dark, opaque coating |
| 44 sun screening film (coating) | 46 nose pad tongue |
| 48 nose piece rabbet | 50 ear piece arms |
| 52 ear piece pivots | 54 frame lugs |
| 55 hinges for ear piece (56) | 56 telescoping ear pieces |
| 58 ear piece end-extenders | 60 eyeshield lens piece |
| 62 nose area covering | 64 helmet attachment means |

DETAILED DESCRIPTION OF THE PREFERRED EMBODIMENT

FIGS. 1 to 5 and FIG. 9

Referring now to the drawings wherein like numerals designate like and corresponding parts throughout the several views, FIG. 1 is a left front perspective view. A bicycle rider in a crouched riding position, called the dropped position, is using the eyeglass embodiment of a lens piece 12 in traffic. The anatomical shape of a lateral outboard mirror section 10 of the lens piece ensures the view to the rear is not hindered by either cheek 14, ear 15, shoulder 16 or hair 17 of the rider. The mirror section similarly ensures rear views unhindered by a strap 21 of his helmet 19. The view to eventual traffic approaching from behind the forward facing user is shown by a dashed arrow 18 for illustration purposes only.

Reference is made to FIGS. 2 through 5 inclusive. Disclosed is the preferred embodiment of the present invention lens piece 12 which is disposed in an eyeglass assembly. The assembly includes the following principal elements: lens piece 12, a frame 20, a nose piece 24 and two ear pieces 28. Frame 20 comprises a wide curved brow section 23 and a thick brow pad 26. Lens piece 12 has a central inboard transparent section 34 which is optically correct (undistorted). Mirror sections 10 are fully reflective. Dashed lines 35 and 36 (FIGS. 2, 3 and 5) are the separation lines between the transparent and mirror sections.

FIG. 3 shows an imaginary central vertical axis Y—Y about which lens piece 12 and the eyeglass assembly are symmetrical. Transparent section 34 extends laterally between, in front of, above, below and a space distance outwardly from the sides of a user's eyes 13 to the approximate sides of his head 11. The user's eyes and portions of the sides of the user's head which are hidden by lens piece 12 are depicted in FIG. 3 by dashed lines. Transparent section 34 of lens piece 12 is spheroidal in form and composed of a sun filtering, light transmissive material commonly used in sunglasses. Mirror sections 10 are of the same material, however, the viewing surfaces are flat to slightly convex. Mirror sections 10 are positioned in the near proximity of the user's eyes and extend laterally outward from within the sides of, to externally beyond the sides of the user's head. The mirror sections cover respective areas defined by a portion of the corresponding margins of transparent section 34 and continuing uniformly to include the adjoining areas extending externally beyond the sides of a user's head 11. The preferred height of mirror sections 10 is ⅓ or less of the height of the corresponding margin of the transparent section, thereby leaving approximately ⅔ of the margins of transparent section 34 unobstructed. Transparent section 34 and mirror sections 10 may be either clear or tinted. Lens piece 12 has substantially parallel surfaces and a thickness of approximately 1.5 mm. Transparent section 34 of lens piece 12 has a convex front face and a concave rear face; the curvature of this spheroidal segment has a radius in the approximate range of between 17.0 cm to about 20.0 cm and a chord of approximately 15.5 cm.

Referring again to FIG. 3, the frame comprises a lens piece receiving section 22 extending laterally in opposite directions from the vertical axis Y—Y. Connected at each end of frame 20 are ear pieces 28 (FIGS. 2, 5 and shown fragmentarily in FIG. 4) which are attached by a conventional hinge 30. Ear pieces 28 may be attached directly to lens piece 12 by employing screws commonly used in eyeglass construction. Lens piece receiving section 22 of the frame have an internal slotted groove therein adapted to receive the closely fitted upper edge of lens piece 12. The center portion of lens piece 12 has an upward extending recess accommodating nose piece 24. Nose piece 24 is held in place by a slotted groove therein which is likewise adapted to receive the closely fitted recessed edge of lens piece 12. Lens piece 12 is additionally provided with notches 32 for mating the lens piece and nose piece together.

FIG. 3 also shows an imaginary central horizontal axis X—X around which lens piece 12 and the frame are selectively rotatable and vertically adjustable. Additionally, the frame may further include two frame lugs 54 and hinges 55 for attaching the corresponding ear pieces as shown in the various operational enhancements. These enhancements are described below and disclosed in FIGS. 6, 7 and 8.

In FIG. 4, frame 20 is shown having integral brow section 23 and brow pad 26 which is variable in thickness for increasing focal distance. Together the wide brow section and thick brow pad measure in the approximate range of between 1.5 cm to about 3.0 cm across. The brow pad is composed of a dense foam or similar material which is held in place by adhesives commonly used for this purpose. Additionally, nose piece 24 has soft nose pads 38 (FIG. 5) commonly used in eyeglasses for supporting the eyeglass assembly on the wearer's nose. The frame, nose and ear pieces are composed of a plastic type material commonly used for this purpose. Proper spatial orientation of mirror sections 10 relative to the eyes of the wearer is critical for them to function correctly. The mirror section's angular relationship to the fixed perpendicular plane P—P (FIG. 4) of transparent section 34 must be maintained in the manufacture of lens piece 12. There exists a tangency between mirror sections 10 and the curved spheroidal segment forming transparent section 34. The intersections of the perpendicular plane P—P of the transparent section with vertical planes V-P of the mirror sections form two acute angles of approximately 20 degrees each. The vertical planes of the mirror sections are then slightly canted downward to an angle of approximately 5 degrees from the perpendicular. While FIG. 4 illustrates vertical plane V-P for one mirror section 10, it should be understood the above relationship applies equally to each mirror section respectively.

The illustrated glasses are intended to be used as wind and weather protective glasses as well as sunglasses. Accordingly, transparent section 34 of the lens piece may be composed of clear, light transmissive material. Alternatively, tinted, light filtering material common in the construction of sun-glasses is used. As lens piece 12 is closely fitted within lens piece receiving sections 22 of frame 20, exchanging lens pieces is easily accomplished by firmly grasping the lens piece in one hand and applying moderate pressure to leverage off the frame held in the other hand. The reverse procedure is used to position the replacement lens piece. Likewise, nose piece 24 can be slightly compressed between thumb and forefinger to disengage it from lens piece notches 32 of the lens piece to be replaced. The removed nose piece is repositioned in the lens piece being substituted by sliding the removed nose piece into the recess of the substituted lens piece. The replaced nose piece will spring into place, once again engaging and mating with the lens piece notches.

Figure 5:
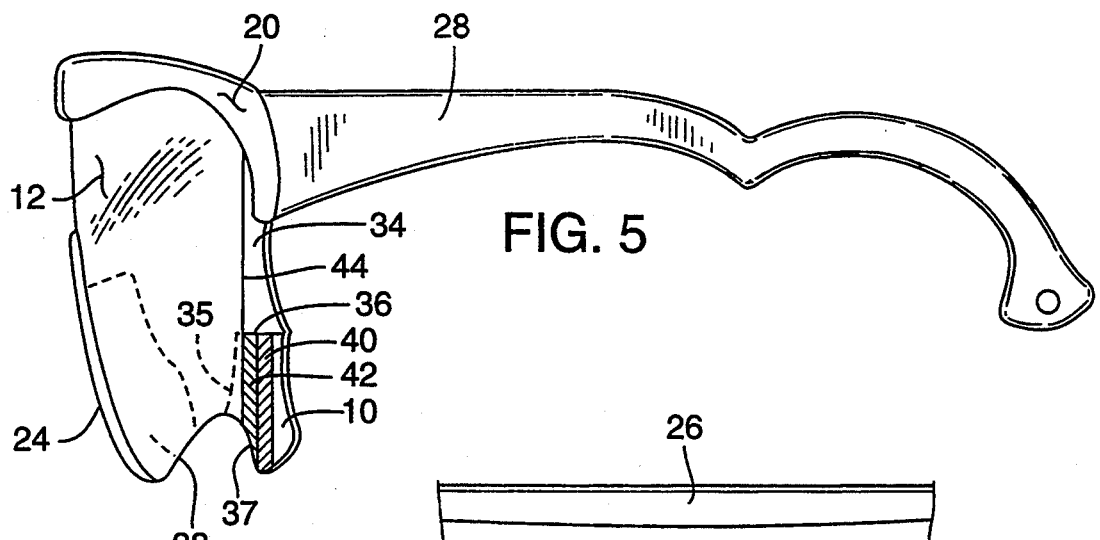
FIG. 5 is a left side view of the eyeglass embodiment.

Referring now to FIG. 5, mirror sections 10 are coated with mercury (or silver) 40 on the front side as shown. Overlaying this first reflective layer, a second layer or layers of dark opaque material 42 is applied. Two mirror sections 10 result which reflect all light impinging thereon. Lens piece 12 may be further coated with a thin multi-layered film of sun screening material 44 commonly used in sunglasses. This film acts to filter out or eliminate glare and undesirable rays. In FIG. 5 these thin layers are represented in a terraced (onion skin) manner for illustration purposes only.

In FIG. 9 a left rear perspective view of a bicycle rider is shown utilizing the eyeglass embodiment of the lens piece. Inside separation line 35, top separation line 36 and an underside inner edge 37 of mirror section 10 are illustrated. The inner boundary line of each mirror section, illustrated as inside separation line 35, is slanted such that the reflected images are not obstructed by, but rather just miss, the rider's cheek, ears, hair and helmet straps. Likewise, underside inner edge 37 of each mirror section is uniquely shaped such that the reflected images are not obstructed by, but rather just miss the rider's shoulder. Hence, the purposeful anatomical shape is tailored to and conforms to the athlete's or sports participant's anatomy. This anatomical shape is advantageous to certain sporting activities requiring a crouched forward body posture as bicycling does. Thus the smallest possible mirror sections are employed keeping rearward visual obstruction to an absolute minimum while maintaining satisfying function and reduced wind resistance.

At the same time that lens piece 12 has an anatomical shape by virtue of its small and purposefully designed mirror sections, it also possesses an aerodynamic form. An aerodynamic advantage is assured by minimizing frontal impact area, thus reducing wind resistance. This has been accomplished by virtue of the small mirror sections described above and by employing a spheroidal form in transparent section 34 of lens piece 12. This spheroidal segment in turn smoothly transitions into the small mirror sections in a continuous agonic unitary lens piece. Thus a clean aerodynamic profile is presented and wind resistance is reduced to a minimum.

DESCRIPTION OF ENHANCEMENTS TO THE EYEGLASS LENS PIECE EMBODIMENT

FIGS. 6, 7, 8

Figure 6:
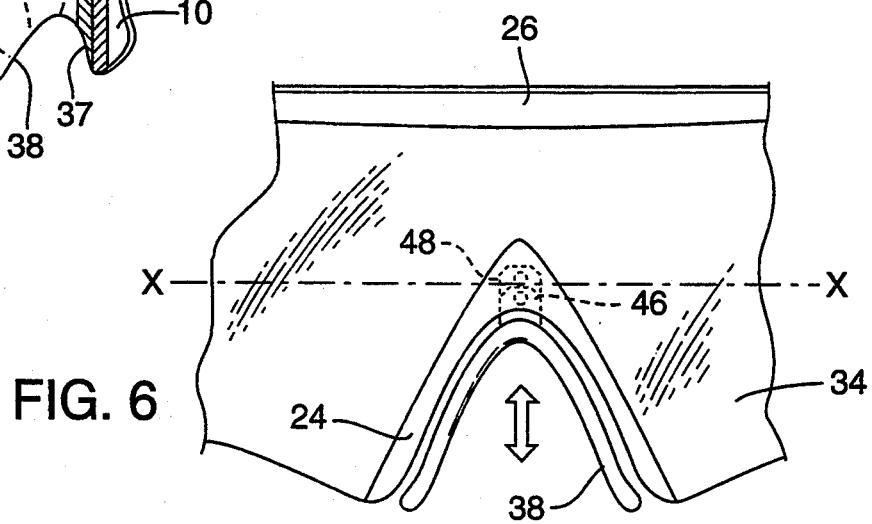
FIGS. 6, 7 and 8 are fragmentary views of alternate eyeglass enhancements of the invention.

FIG. 6 is a fragmentary rear view of lens piece 12 showing the horizontal axis X—X parallel to the perpendicular plane of lens piece 12. An enhancement is disclosed wherein nose piece pads 38 are selectively adjustable by sliding a closely fitted nose pad tongue 46 within a nose piece rabbet 48 adapted to receive it. This construction provides the advantage of raising or lowering the entire eyeglass lens piece assembly relative to the eye level of the wearer, and this enables height adjustments of the lens piece and, specifically, the mirror sections to suit the individual.

Figure 7:
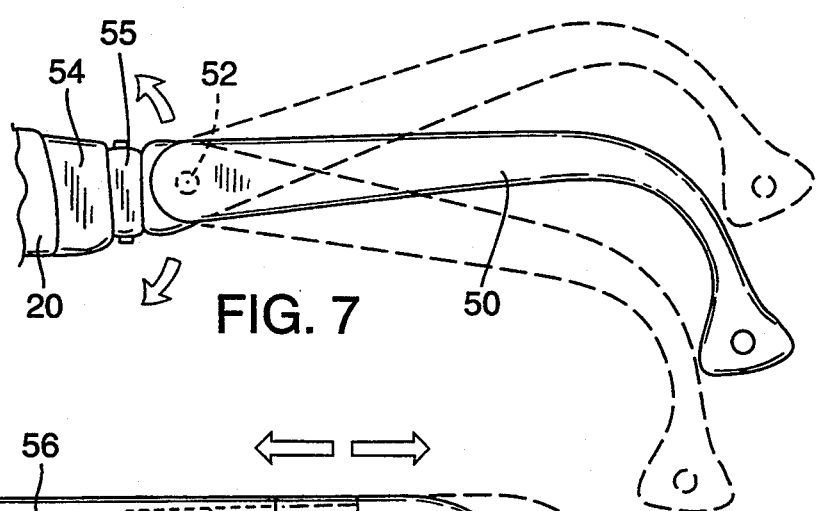

In FIG. 7 another possible enhancement is disclosed for providing angular adjustments of the ear pieces by rotating an ear piece arm 50 around a ratcheted or selectively locking ear piece pivot 52. The arm and pivot assembly are attached on each side of frame 20 by lug 54 and hinge 55. This construction provides for lens piece 12 to be rotated forward or backward around axis X—X thus permitting further adjustment of lens piece 12 and the tilting of mirror sections 10.

Figure 8:
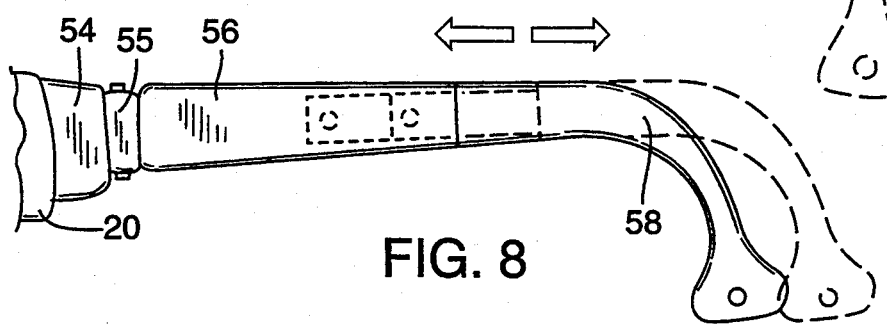

In FIG. 8 yet another enhancement is shown disclosing a construction wherein the ear pieces can be adjusted for length. A telescoping ear piece 56 and an ear piece end-extender 58, which are closely fitted together, provide several adjustments for fit. As in the enhancement of FIG. 7 above, frame lug 54 and hinge 55 are shown. The configuration utilizing lug 54 and hinge 55 is used when combining the present enhancement together with that of FIG. 7 described above. It should be noted, therefore, ear piece 28 and conventional hinge 30 (FIGS. 2 and 4) could likewise be employed here. This construction provides further adjustments serving to custom fit the glasses to the individual user. Moreover, by substituting brow pads 26 (FIGS. 4 and 6) of varying thicknesses, the relative proximity of lens piece 12 from the eyes of the user is thereby increased. This results in greater distance and, therefore, greater focal length to mirror sections 10.

The various alternate enhancements described above and depicted in FIGS. 6, 7 and 8 are not essential to the successful operation of the invention. They are operational enhancements and may be used individually or in any combination. They serve as fine tuning adjustments for the personal fitting of the eyeglass embodiment to each individual user. These enhancements further add versatility and user-friendliness to the invention, as does the incorporation of interchangeable lens pieces for different lighting conditions. Various changes may be made in the detail construction of the enhancements and embodiments, such changes being within the spirit and scope of the appended claims.

DESCRIPTION OF ALTERNATE EMBODIMENT OF THE LENS PIECE—FIG. 10

In FIG. 10 the helmet eyeshield embodiment of the invention is shown. Here eyeshield lens piece 60 is shown which is substantially the same as lens piece 12 of the preferred eyeglass embodiment. The only modifications are as follows: the nose recess is eliminated since nose piece 24 (FIGS. 2, 3 and 5) is not used here. It is replaced by a nose area covering 62 which covers and further protects the user's face. Nose area covering 62 is not a separate piece or structure. It is simply a smooth, uniformed continuation of transparent section 34. The second modification is an attachment means 64 adapted to the top inside edge of eyeshield lens piece 60 and the front brow portion of helmet 19. Thus the eyeshield is securely and rigidly fixed to the user's helmet. Attachment means 64 may employ hook and loop (VELCRO type) adhesive, snaps or a similar type fastener. One component of attachment means 64 is attached to the brow area of a pre-existing sports helmet of the user. The second component of attachment means 64 is attached to the upper portion of the concave inner face of transparent section 34. Ultimately a special helmet may be designed to optimally accommodate eyeshield lens piece 60. As in eyeglass lens piece 12, eyeshield lens piece 60 may be exchanged with an alternate helmet eyeshield lens piece. Eyeshield lens piece 60 is replaced by cradling helmet 19 in the crook of one arm and hand. While thus firmly cushioning the helmet, unsnapping or unfastening the lens piece with the other hand. The reverse procedure is used to securely fit the replacement lens piece to the helmet.

SUMMARY, RAMIFICATION AND SCOPE

From the foregoing, the reader will appreciate that the present invention provides an aerodynamic, anatomic, technically satisfying and aesthetically pleasing lens piece that can be adapted to either eyeglasses or a helmet eyeshield. In addition, the embodiments are easy to use, convenient and effective in solving the long standing problem of 'seeing behind'. For the bicyclist and other sport participant requiring good spatial orientation, they will greatly enhance the user's safety -increased safety once again being the principal object of the present invention. Aside from bicycle riders, joggers, skateboarders, roller skaters, in-line skaters, boaters, jet skiers, motorcyclists, police, security guards, safety personnel and pedestrians could likewise benefit as users of the present invention.

Summing up, the reader will see that the invention solves the problem of 'seeing behind' by making possible panoramic spatial orientation without requiring undue and unwelcome accommodation by the user. It is irrefutably clear that to advance the art an eyeglass lens piece must have good aerodynamic and anatomical characteristics, have technically satisfying function and have aspects exhibiting a style commensurate with the accepted norm. The present invention achieves the stated objects. Its streamlined, aerodynamic form and its high-tech styling are beneficial to certain sports and in keeping with the high tech sporting image established by the market place itself rather than in conflict with it.

In conclusion, the aforesaid description of the enhancements and the preferred and alternate embodiments of the invention have been presented for the purposes of illustration and disclosure. It is not intended to be exhaustive or to limit the invention to the precise form disclosed. Many modifications and variations are possible in light of the above teaching. It is intended that the scope of the invention be limited not by this detailed description but, rather, by the claims appended hereto.

I claim:

1. An eyeglass lens piece configured for both forward and rearward viewing, said eyeglass lens piece adapted by a supporting means on the head and centered a predetermined space distance in front of the user's eyes, the lens piece comprising in an integrated unit:
   (a) at least one substantially spheroidally curved transparent section extending between, in front of, above, and below said user's eyes and a space distance laterally from the sides of said user's eyes to the approximate sides of the user's head;
   (b) at least one mirror section tangentially oriented to an edge of the transparent section, said mirror section extending laterally outward from within the side of, to externally beyond the side of the user's head;
   (c) said mirror section positioned in the near proximity and with predetermined focal distance to the user's eye;
   (d) said tangentially oriented mirror section having a tangentially angular orientation out of the normal perpendicular plane of the transparent section and may be further canted downward from the vertical, permitting targeted views of objects to the rear;
   (e) said mirror section covering an area defined by a preferably small fractional portion of a corresponding margin of the transparent section and continuing uniformly to include an adjoining area extending externally beyond the side the user's head;
   (f) said area of the mirror section thus defined leaving a remainder of said corresponding margin of the transparent section totally unobstructed for peripheral vision to the sides, thereby permitting a full range of unhindered forward vision.

2. The eyeglass lens piece configured for both forward and rearward viewing of claim 1 wherein the mirror section is preferably located at the lower, distal extremity of the lens piece.

3. The eyeglass lens piece configured for both forward and rearward viewing of claim 1 wherein the preferred height of the mirror sections is not more than approximately ⅓ that of the corresponding lateral margin of the transparent section.

4. The eyeglass lens piece configured for both forward and rearward viewing of claim 1 wherein the lens piece by itself as well as when disposed in said supporting means is devoid of all moving or forward protruding parts.

5. The eyeglass lens piece configured for both forward and rearward viewing of claim 1 wherein the mirror section is tangentially oriented to the transparent section at a point forming an angle of approximately 20 degrees with a perpendicular plane of the transparent section and the mirror section further having a downward cant of approximately 5 degrees from the vertical.

6. The eyeglass lens piece configured for both forward and rearward viewing of claim 1 wherein the preferred embodiment of the lens piece is disposed in an eyeglass, the eyeglass embodiment including an eyeglass frame, a pair of ear pieces and a nose piece, the lens piece having an upper edge closely fitting within a lens piece receiving portion of said eyeglass frame, the lens piece further having an upward extending recess within a lower edge accommodating said nose piece: whereby the frame, the ear pieces and the nose piece cooperate to support the lens piece on the head of the user such that said mirror section reflects targeted images along a line of sight substantially parallel to the side of said wearer's head.

7. The eyeglass lens piece configured for both forward and rearward viewing of claim 1 wherein an alternate embodiment of the lens piece is disposed in a helmet eyeshield, the eyeshield embodiment having a transparent section uniformly continuing across the nose area, said helmet eyeshield being adaptable for mounting on a sports helmet by an attachment means for rigidly affixing the eyeshield to said sports helmet: whereby the eyeshield is suspended from the helmet in front of the eyes of the user such that said mirror section reflects targeted images along a line of sight substantially parallel to the side of said wearer's head.

8. A unitary eyeglass lens piece including an outboard viewing means extending laterally beyond the sides of a user's head for seeing objects behind the forward facing user comprising:
   (a) a centrally inboard and spheroidally curved transparent section for forward viewing having a convex front face and a substantially parallel concave rear face and extending between, in front of, above, and below the user's eyes and a space distance laterally from the sides of the user's eyes to the approximate sides of the user's head;
   (b) said outboard viewing means for seeing objects behind the forward facing user comprising: at least one mirror section angled backward away from the normal perpendicular plane of the transparent section and laterally located at either distal outboard extremity from the associate transparent section and extending outward from within the side, to externally beyond the side, of the user's head;
   (c) said mirror section positioned in the near proximity and at an adequate space distance for the user to momentarily focus his eyesight thereon;
   (d) said mirror section covering an area defined by a preferably small fractional portion of a corresponding margin of the transparent section and continuing uniformly to include an adjoining area extending externally outboard beyond the side of the user's head, thus permitting targeted views of objects to the rear along a line of sight substantially parallel to the side of the user's head;
   (e) said area of said mirror section thus defined leaving a remainder of said corresponding margin of the transparent section totally unobstructed for peripheral vision to the sides, thereby permitting a full range of unhindered forward vision.

9. The unitary eyeglass lens piece including a viewing means for seeing objects behind a forward facing user cited in claim 8 wherein the lens piece is disposed in an eyeglass frame, including a pair of ear pieces and a nose piece, the lens piece having an upper edge closely fitting within a lens piece receiving portion of the frame, the lens piece further having a lower edge with an upward extending recess therein accommodating a nose piece, thereby supporting the lens piece in cooperation with said eyeglass frame and the ear pieces on the head of the wearer.

10. The unitary eyeglass lens piece including a viewing means for seeing objects behind a forward facing user cited in claim 8 wherein the lens piece is disposed in said eyeglass frame further including a wide curved brow and a thick brow pad measuring together in the range of between 1.5 cm to about 3.0 cm.

11. The unitary eyeglass lens piece including a viewing means for seeing objects behind a forward facing user cited in claim 8 wherein the lens piece is disposed in a helmet eyeshield, the eyeshield embodiment having a transparent section uniformly continuing across the nose area, said helmet eyeshield being adaptable for mounting on a sports helmet by an attachment means for rigidly affixing the eyeshield to said sports helmet: whereby the eyeshield is suspended from the helmet in front of the eyes of the user such that said mirror section reflects targeted images along a line of sight substantially parallel to the side of the wearer's head.

12. The unitary eyeglass lens piece including a viewing means for seeing objects behind a forward facing user cited in claim 8 wherein the curved transparent section and the angled back mirror sections form one agonic, streamlined lens piece having aspects which reduce the frontal impact area, thereby lowering wind resistance and resulting in superior aerodynamic performance advantageously benefiting the user participating in certain sports.

13. The unitary eyeglass lens piece including a viewing means for seeing objects behind a forward facing user cited in claim 8 wherein said outboard viewing means each have an inner and an under side shaped such that the reflected images are not obstructed by, but in the norm just miss, the user's cheeks, ears, helmet straps, hair and shoulders, thereby providing an anatomical shape advantageous to certain sporting activities, principally bicycling.

14. In an integral combination, a unitary eyeglass lens piece configured for both forward vision and for seeing targeted objects behind a forward facing user, said unitary eyeglass lens piece disposed in a supporting means for mounting the lens piece on the head of the user, said integral combination comprising:
 (a) a spheroidally formed transparent section centrally positioned a predetermined space distance in front of and extending between, above and below the user's eyes and a space distance laterally from the sides of the user's eyes to the approximate sides of the user's head;
 (b) at least one integrally incorporated mirror section located outboard at either extreme edge of the associate inboard transparent section and extending laterally outward from within a side of the user's head, to externally beyond said side of the user's head;
 (c) the mirror section being positioned in the near proximity and with sufficient space distance for focusing the user's eye, and further having a tangentially angular orientation to the normal perpendicular plane of the transparent section;
 (d) the mirror section covering an area defined by a preferably small fractional portion of a corresponding margin of the transparent section and continuing uniformly to include an adjoining area extending externally beyond said side of the user's head, thus permitting targeted views of objects to the rear along a line of sight substantially parallel to said side of the user's head;
 (e) said area of the mirror section thus defined leaving a remainder of said corresponding margin of the transparent section totally unobstructed for peripheral vision to the sides, thereby permitting a full range of unhindered forward vision as well.

15. The integral combination in a unitary eyeglass lens piece recited in claim 14 wherein the mirror section is preferably positioned at the lower, distal extremity of the lens piece and the preferred height is not more than approximately $\frac{1}{3}$ that of said corresponding margin of the transparent section.

16. The integral combination in a unitary eyeglass lens piece recited in claim 14, further including a tinted transparent section or a sun screening film on a face of the transparent section whereby the lens piece is usable as sunglasses.

17. The integral combination in a unitary eyeglass lens piece recited in claim 14 wherein said spheroidally formed transparent section of the lens piece has a radius in the range of between 17.0 cm to about 20.0 cm and a chord of approximately 15.5 cm.

18. The integral combination in a unitary eyeglass lens piece recited in claim 14 wherein the tangentially oriented mirror sections form an angle of approximately 20 degrees with the perpendicular plane of the associated central transparent section, and the mirror sections may be further angled downward by approximately 5 degrees from the vertical.

19. The integral combination in a unitary eyeglass lens piece recited in claim 14 wherein the lens piece is disposed in an eyeglass embodiment including an eyeglass frame and a wide curved brow and a thick brow pad measuring together in the range of between 1.5 cm to about 3.0 cm.

20. The integral combination in a unitary eyeglass lens piece recited in claim 14 wherein the lens piece is disposed in a helmet eyeshield, the eyeshield embodiment having a transparent section uniformly continuing across the nose area, said helmet eyeshield being adaptable for mounting on a sports helmet by an attachment means for rigidly affixing the eyeshield to said sports helmet: whereby the eyeshield is suspended from the helmet in front of the eyes of the user such that with a minimum of head movement, the mirror section provides specifically targeted views of eventual traffic approaching from the rear thus improving safety in certain sporting activities especially bicycling and in-line skating.

* * * * *